US006836828B2

United States Patent
Kao

(12) United States Patent
(10) Patent No.: US 6,836,828 B2
(45) Date of Patent: Dec. 28, 2004

(54) INSTRUCTION CACHE APPARATUS AND METHOD CAPABLE OF INCREASING A INSTRUCTION HIT RATE AND IMPROVING INSTRUCTION ACCESS EFFICIENCY

(75) Inventor: Min-Cheng Kao, Taipei (TW)

(73) Assignee: Faraday Technology Corp., Hsinchu (TW)

( * ) Notice: Subject to any disclaimer, the term of this patent is extended or adjusted under 35 U.S.C. 154(b) by 289 days.

(21) Appl. No.: 10/115,715

(22) Filed: Apr. 3, 2002

(65) Prior Publication Data

US 2003/0191897 A1 Oct. 9, 2003

(51) Int. Cl.[7] .............................................. G06F 12/00
(52) U.S. Cl. ....................... 711/138; 711/118; 711/119; 711/120; 711/123; 711/125; 711/128; 711/138; 709/201; 709/213; 709/217; 709/226; 712/206; 712/215; 712/228
(58) Field of Search ......................... 711/118–120, 123, 711/125, 126, 128, 129–130, 138, 154; 709/201, 213, 217, 226; 712/206, 215, 218

(56) References Cited

U.S. PATENT DOCUMENTS

| | | | | |
|---|---|---|---|---|
| 4,802,085 A | * | 1/1989 | Levy et al. ..................... 710/3 |
| 5,155,824 A | * | 10/1992 | Edenfield et al. ........... 711/143 |
| 5,828,860 A | * | 10/1998 | Miyaoku et al. ............ 712/207 |
| 6,076,145 A | * | 6/2000 | Iwata et al. .................. 711/125 |
| 2002/0194464 A1 | * | 12/2002 | Henry et al. ................ 712/239 |

OTHER PUBLICATIONS

Johnson et al., Dec. 1999, IEEE, vol. 48, pp. 1338–1354.*

* cited by examiner

Primary Examiner—Donald Sparks
Assistant Examiner—Hashem Farrokh
(74) Attorney, Agent, or Firm—J.C. Patents

(57) ABSTRACT

The present invention provides an instruction cache apparatus and method using the instruction read buffer. The apparatus comprises an instruction hit analysis unit, an instruction read buffer, a first cache instruction word memory, a second cache instruction word memory, a first multiplexer and a second multiplexer. The instruction hit analysis unit receives a programmable counter output signal, compares this with a plurality of tags, and after the analysis, outputs the instruction hit signal of the instruction read buffer and the instruction hit signal of the first cache instruction word memory. The second multiplexer reads the expected instruction word from one of either the first cache instruction word memory, the second cache instruction word memory or the first multiplexer according to the instruction hit signal of the instruction read buffer and the instruction hit signal of the first cache instruction word memory. While the bus interface waits for the next demanded instruction word to reply to the instruction read buffer, it writes an instruction line into the first or the second cache instruction word memory. Wherein, the instruction line is in the instruction read buffer and includes the previously expected instruction word.

16 Claims, 3 Drawing Sheets

INSTRUCTION CACHE APPARATUS AND METHOD CAPABLE OF INCREASING A INSTRUCTION HIT RATE AND IMPROVING INSTRUCTION ACCESS EFFICIENCY

BACKGROUND OF THE INVENTION

1. Field of Invention

The present invention generally relates to an instruction cache apparatus and method, and more particularly, to an instruction cache apparatus and method using the instruction read buffer (IRB).

2. Description of Related Art

The cache memory is mostly composed of the cache instruction word memory and the cache tag memory. The instruction word stored in the cache instruction word memory and the tag stored in the cache tag memory correspond to each other. Therefore, generally, when the CPU needs to access the memory, the cache tag memory is checked to determine whether the tag of the expected instruction word exists or not. If the tag exists, it also means the cache instruction word memory contains the expected instruction word, the so called "instruction hit". The cache tag memory subsequently issues an instruction hit signal to the cache instruction word memory to read the expected instruction word from the cache instruction word memory. If the tag does not exist, the so called "instruction miss", the expected instruction word is read from the main memory via the bus interface unit.

Referring to FIG. 1, it is known by those skilled in the art that the apparatus and method of the conventional instruction cache is that the cache tag memory 108, 109 are searched first when it is required to access an instruction word addressed by CPU, to determine whether the tag of the expected instruction word exists. The tag stored in the cache tag memory 108, 109 is also the tag of the instruction word stored in the cache instruction word memory 106 and the cache instruction word memory 107. Moreover, the tag stored in the cache tag memory 108, 109 is compared with the output signal of the programmable counter 115 (this signal includes the tag of the instruction word expected by CPU) by using the comparator 111 and the comparator 112 tightly coupled to the cache tag memory 108, 109. If there is a match, the instruction is hit. The comparator 111 subsequently issues an instruction hit signal, so that the multiplexer 104 can proceed with the fetch operation from the cache instruction word memory where the expected instruction word is stored, and subsequently output the needed instruction word.

If there is not a match, the instruction is missed. The CPU issues a request to the main memory through the bus interface unit (BIU) 101, waits for the main memory to reply to the buffer interface unit 101, and temporally stores the request in the instruction read buffer 102. When the bus interface unit 101 replies with an instruction word to the instruction read buffer 102, it writes the instruction word that was originally stored in the instruction read buffer 102 into the cache instruction word memory 106 or 107.

Referring to FIG. 2, the conventional instruction read buffer 102 is equal to a line in the memory. The line is able to store four instruction words (W0, W1, W2, W3). That is, four instruction words can be stored in a line simultaneously at one time. The multiplexer 103 is controlled by the programmable counter 115 and the write-index signal that is the input of the multiplexer 117. When the next instruction word is going to be stored temporarily in the instruction read buffer 102, the multiplexer 103 is controlled to write the instruction word into the cache instruction word memory 106 or the cache instruction word memory 107 in a word-by-word manner. Furthermore, the multiplexer 104 fetches the needed instruction word from the cache instruction word memory 106 or the cache instruction word memory 107 for use by the CPU.

Therefore, when the instruction is missed, the CPU has to spend time accomplishing the operation of the expected instruction word assignment.

The time needed is approximately: time needed for the CPU to issue a request to main memory+time needed for the bus interface unit to wait for a reply+time needed for writing into cache instruction word memory+time needed for expected instruction word assignment.

The time needed for the CPU to issue the request to the main memory is about 1~2 clock periods, whereas the time needed for the bus interface unit to wait for the reply is about 10+ clock periods, and when the bus interface unit waits for the reply, the cache instruction word memory is in the idle state. Therefore, the memory management is not efficient.

SUMMARY OF THE INVENTION

In the view of this, the present invention provides a cache apparatus and method using the cache read buffer. The apparatus and method is able to increase the instruction hit rate, and to perform the instruction word write operation when the bus interface unit is waiting for the reply.

The present invention is able to access the instruction word in the cache instruction word memory more efficiently by the addition of an output path, counter and comparator of the instruction read buffer.

The present invention provides an instruction cache apparatus using the cache read buffer. The apparatus comprises an instruction hit analysis unit, an instruction read buffer, a first cache instruction word memory, a second cache instruction word memory, a first multiplexer and a second multiplexer. When the instruction hit analysis unit receives the output signal of the programmable counter, after comparing and analyzing with a plurality of tags, it outputs a signal that includes the instruction hit signal of the instruction read buffer and the instruction hit signal of the first cache instruction word memory. The instruction read buffer temporarily stores the instruction word replied by the bus interface unit. The first cache instruction word memory stores the instruction word replied by the bus. The second cache instruction word memory stores the instruction word replied by the bus. The first multiplexer receives a plurality of instruction word output signals of the instruction read buffer. The first multiplexer is controlled via the control signal according to the instruction hit signal of the instruction read buffer and the instruction hit signal of the first cache instruction word memory, to write an instruction line, which includes the instruction word and is contained in the instruction read buffer, into the first cache instruction word memory, or to write the instruction line into the second cache instruction word memory, or to output the instruction word that is contained in the instruction read buffer to the second multiplexer. The second multiplexer receives and reads the expected instruction word from the first cache instruction word memory or the second cache instruction word memory or the instruction read register according to the instruction hit signal of the instruction read buffer and the instruction hit signal of the second cache instruction word memory.

The present invention further provides an instruction cache apparatus using the cache read buffer. The apparatus comprises the instruction hit analysis unit, the instruction read buffer, at least a cache instruction word memory, the first multiplexer and the second multiplexer. The instruction hit analysis unit receives the output signal of the programmable counter, and after comparing and analyzing it with a plurality of tags, outputs a signal that includes the instruction hit signal of the instruction read buffer and the instruction hit signal of the first cache instruction word memory. The instruction read buffer temporarily stores the instruction word replied by the bus interface unit. The cache instruction word memory stores the instruction word replied by the bus. The first multiplexer receives a plurality of instruction word output signals from the instruction read buffer. The first multiplexer is controlled via the control signal according to the instruction hit signal of the instruction read buffer and the instruction hit signal of the first cache instruction word memory, to write an instruction line, which includes the instruction word and is contained in the instruction read buffer, into the cache instruction word memory, or to output the instruction word that is contained in the instruction read buffer to a second multiplexer. The second multiplexer receives and reads the expected instruction word from the cache instruction word memory or the instruction read buffer according to the instruction hit signal of the instruction read buffer and the instruction hit signal of the first cache instruction word memory.

The present invention further provides an instruction cache method using the read register, and the method is used in the instruction cache system. The method comprises the steps of: directly outputting the first instruction word from the instruction read buffer of the instruction cache system; when the instruction miss occurs in the instruction cache system and when waiting for a second instruction word replied by a bus interface unit, simultaneously writing an instruction line, that includes the first instruction word and is contained in the instruction read buffer, into the cache instruction word memory of the instruction cache system.

The present invention utilizes the addition of the new path, counter and comparator to achieve the objective of: when reading, the instruction read buffer can be used as the source of the instruction word; and when the instruction read buffer is waiting for the reply from the bus interface unit, the instruction word stored can be written into the cache instruction word memory. Therefore, by adding a few elements, the objective of increasing the instruction hit rate and increasing the cache apparatus working efficiency can be achieved.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings, FIG. 1 schematically shows a partial circuit diagram of the conventional cache apparatus.

DESCRIPTION OF THE PREFERRED EMBODIMENTS

The concept of the present invention is to add a new path, a new counter and a new comparator, to achieve the objective of increasing the instruction hit rate and reducing the time wasted writing into the cache apparatus when the instruction miss occurs.

Figure 3:
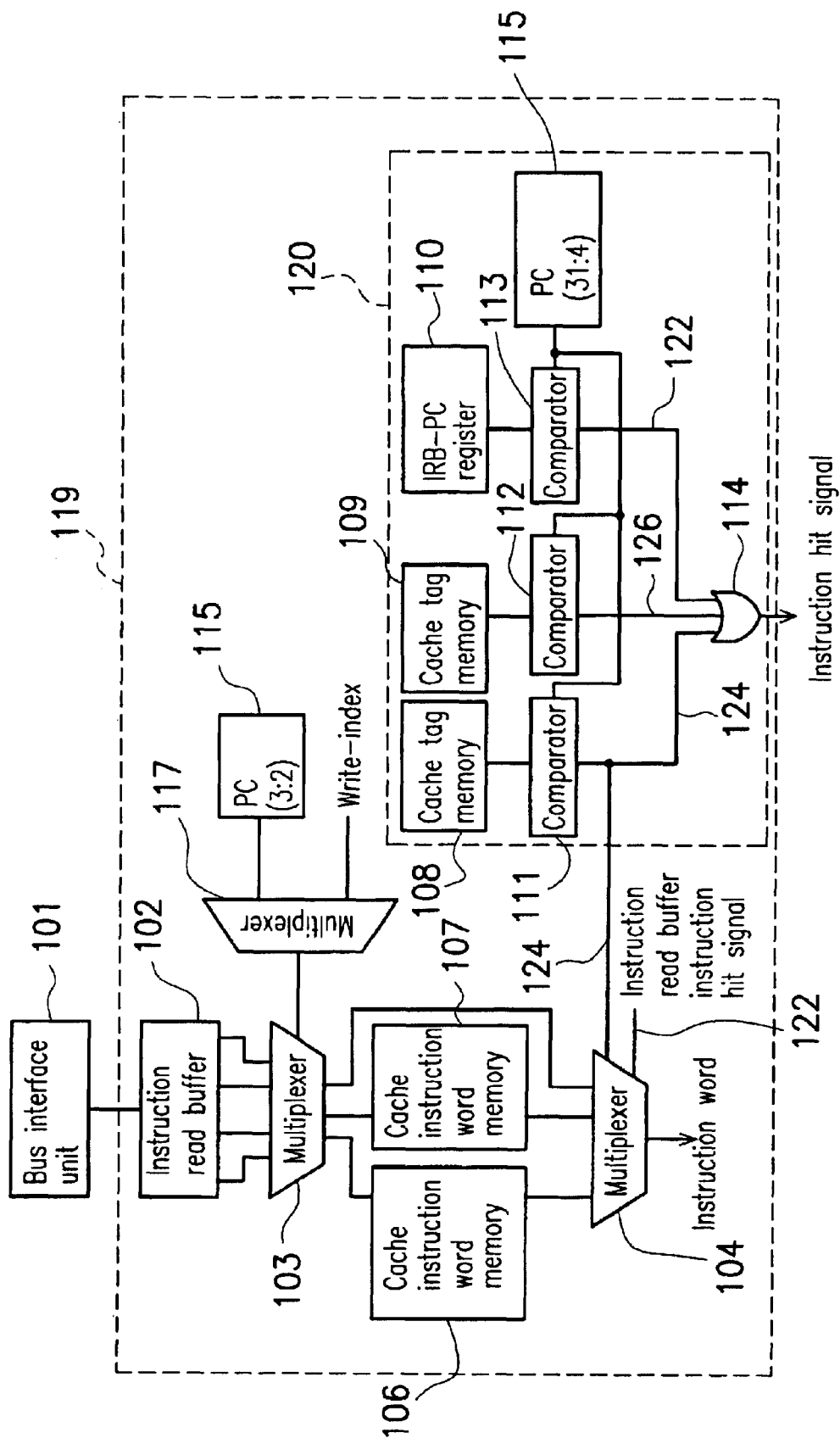
FIG. 3 schematically shows a partial circuit diagram of a cache apparatus using the instruction read buffer of the preferred embodiment according to the present invention.

FIG. 3 schematically shows a partial circuit diagram of a cache apparatus 119 using the instruction read buffer of the preferred embodiment according to the present invention. The apparatus of the instruction read buffer of the present invention comprises the instruction read buffer (IRB) 102, the cache instruction word memory 106, the cache instruction word memory 107, the multiplexer 104, and the instruction hit analysis unit 120. The multiplexer 104 is controlled by the cache instruction word memory instruction hit signal 124 (i.e. the instruction hit signal of the cache instruction word memory 106 or 107) and the instruction read buffer instruction hit signal 122 that are output from the instruction hit analysis unit 120, to fetch the instruction word stored in the cache instruction word memory 106 or the cache instruction word memory 107 or the instruction read buffer 102. The instruction hit analysis unit 120 comprises the first tag determine unit, the second tag determine unit, the instruction read buffer determine unit, and the OR gate 114 that is used to receive the output from those three units mentioned above.

Figure 1:
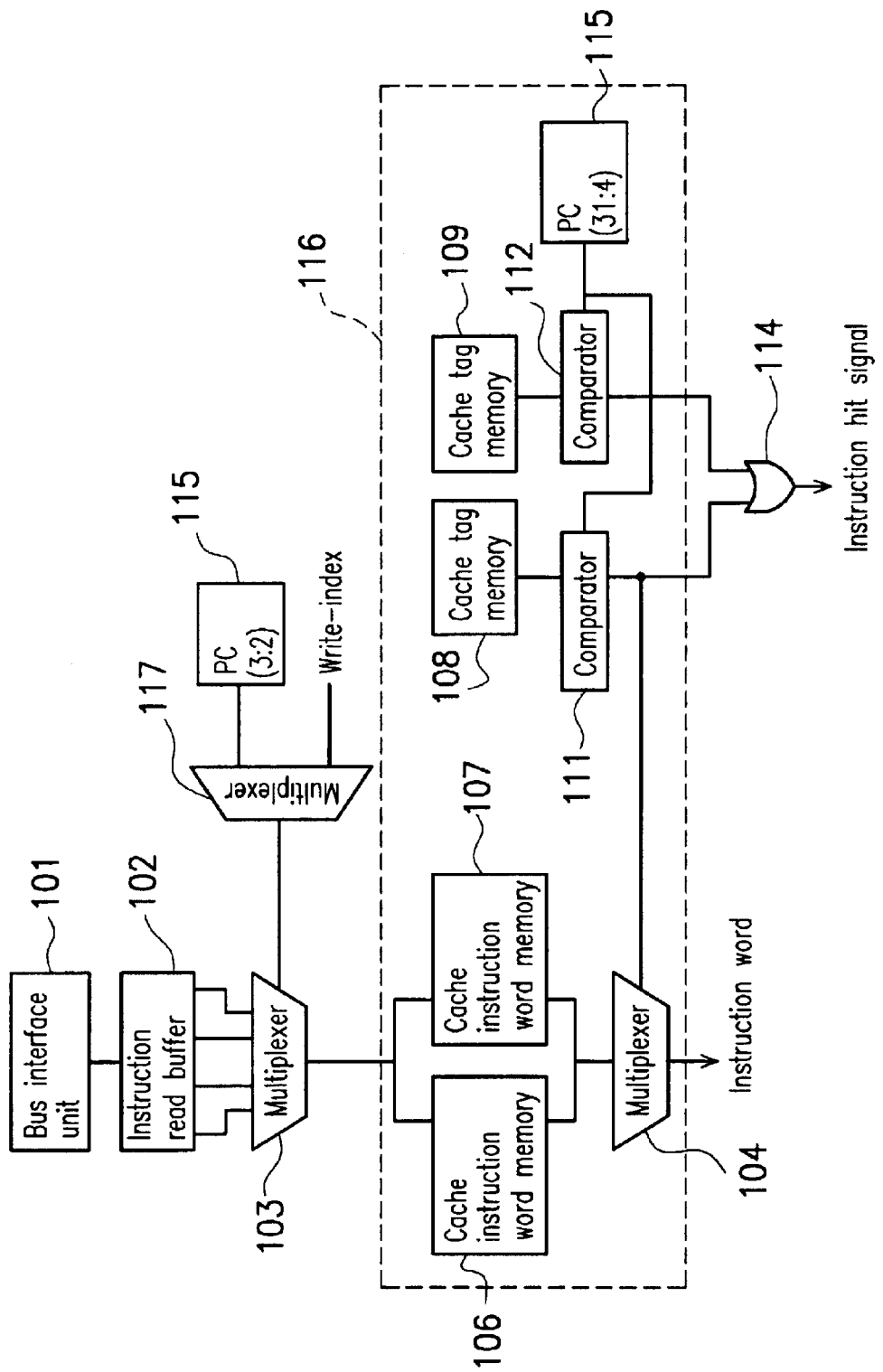
Figure 2:
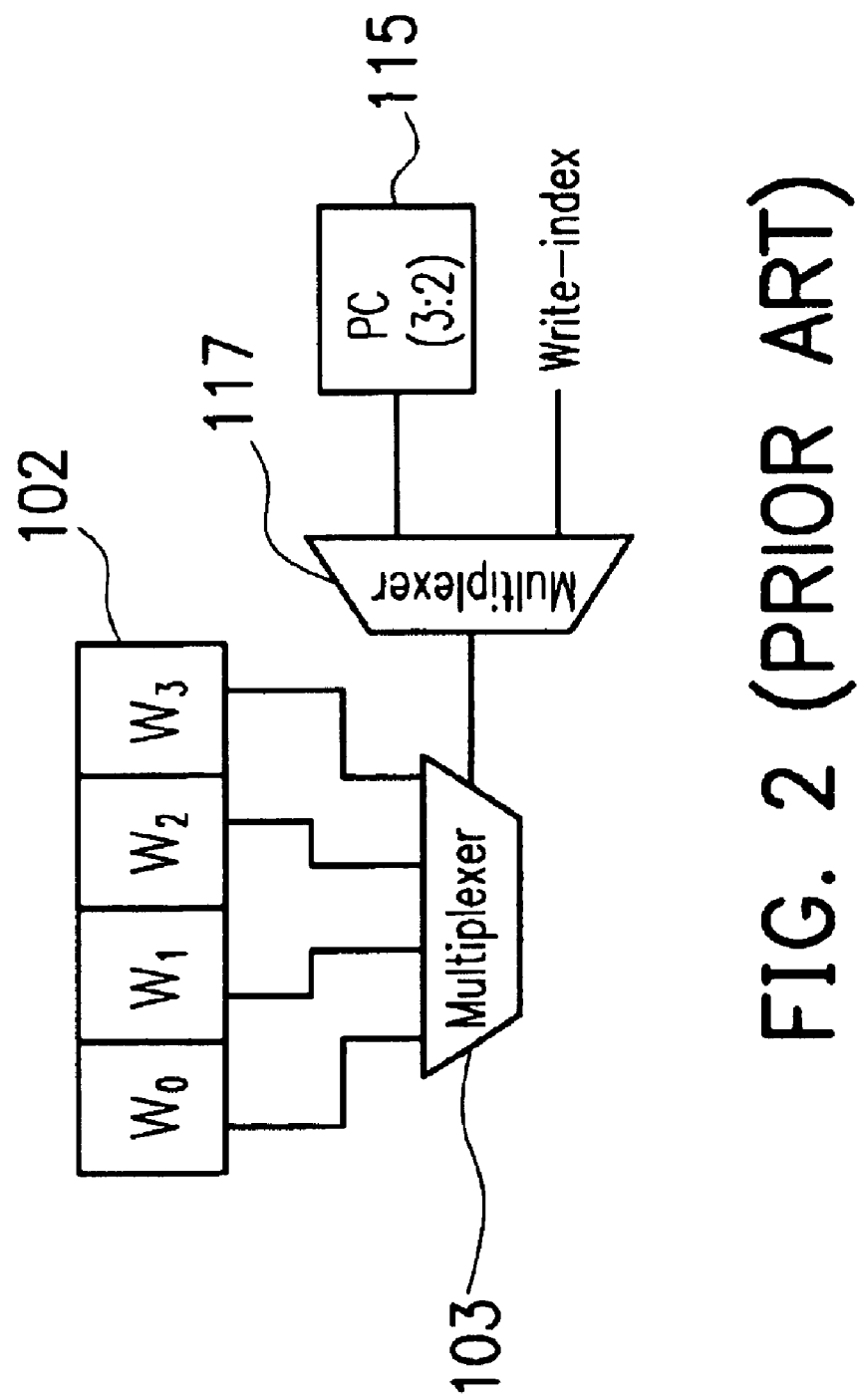
FIG. 2 schematically shows a connection relationship diagram of the conventional instruction read buffer.

The present invention particularly arranges to add an output path to the multiplexer 103. Thus, the instruction word temporarily stored in the instruction read buffer 102 can be read directly via the multiplexer 103 to the multiplexer 104. That is, the input of the multiplexer 104 includes the instruction word from the instruction read buffer 102 directly. Moreover, the method of the instruction read buffer 102, whereby it writes the instruction word output from the bus interface unit 101 into the cache instruction memory word 106 or 107 via the multiplexer 103, is different from the conventional method. As shown in FIG. 2, the instruction read buffer 102 is a line that is capable of storing four instruction words. The conventional arrangement writes the instruction word temporarily stored in the instruction read buffer 102 into the cache instruction word memory 106 or 107 via the multiplexer 103 in a manner of one instruction word at a time and so the writing of the instruction word is divided in four times. However, the present invention is particularly arranged to write the instruction word temporarily stored in the instruction read buffer 102 into the cache instruction word memory 106 or 107 via the multiplexer 103 in the manner of one line at a time, that is, four instruction words can be written in one time.

Therefore, when the CPU issues a demand for the first requested instruction word, and the needed first requested instruction word is temporarily stored in the instruction read buffer 102, the first requested instruction word is subsequently read out via the multiplexer 104 directly and by the control of the instruction read buffer instruction hit signal 122, for use by the CPU. When an instruction miss occurs in the second requested instruction word issued by the CPU, it is required to re-search the second requested instruction word needed by the CPU via the bus interface unit 101 again. At this moment, according to the characteristic of the present invention, while waiting for the reply from the bus interface unit, the four instruction words (which include the first requested instruction word) contained in the instruction read buffer 102 can be written into the cache instruction word memory 106 or 107. Therefore, the present invention does not have to wait to write the requested instruction word into the cache instruction word memory 106 or 107 until the second requested instruction word is fetched via the bus interface unit 101 and is input into the instruction read buffer 102 (the present invention does not use the conventional method that writes into the cache instruction word memory 106 and 107). That is, as the present invention overlaps the writing operation of the cache instruction word memory 106 or 107 and the time for the instruction read buffer 102 to wait for the reply from the bus interface unit 101, the time for writing into the cache instruction word memory can be eliminated.

In order to cooperate with its operation mode, the multiplexer 104 is controlled by the instruction hit analysis unit 120. The instruction hit analysis unit 120 comprises the first tag determine unit, the second tag determine unit, the instruction read buffer determine unit, the programmable counter (PC) 115 and the OR gate 114. The first tag determine unit comprises a cache tag memory 108 and a comparator 111, and the cache tag memory 108 and the comparator 111 are serially connected. The second tag determine unit comprises a cache tag memory 109 and a comparator 112, and the cache tag memory 109 and the comparator 112 are serially connected. The instruction read buffer determine unit comprises an IRB programmable counter (IRB-PC) register 110 and a comparator 113, and the IRB-PC register 110 and the comparator 113 are serially connected. The programmable counter 115 outputs the signal to the comparator 111, 112 and 113. The output signal of the comparator 111 is the first cache instruction word memory instruction hit signal 124, and the output signal is output to the multiplexer 104 and the OR gate 114 simultaneously. The output signal of the comparator 112 is the second cache instruction word memory instruction hit signal 126, and the output signal is output to the OR gate 114 directly. The output signal of the comparator 113 is the instruction read buffer instruction hit signal 122, and the output signal is output to the multiplexer 104 and the OR gate 114.

When the CPU issues an instruction word demand to the memory, the cache tag memory 108, 109 is checked first to determine whether the tag matched to the needed instruction word exists or not. This is also equal to determining whether the needed instruction word exists in the cache instruction word memory 106, 107 or not. The cache instruction word memory used is the two way set associate, and is used as an example herein. However, the cache instruction word memory with any number that is greater or equal to one way set associate can be used in the physical case depending on the real design. Moreover, the present invention further comprises a path to compare and determine, in the same period, whether the needed instruction word exists in the instruction read buffer or not via the IRB-PC register 110, that is able to store at least one indication bit, the programmable counter 115, and the comparator 113.

If the first requested instruction word is needed by the CPU, and the cache tag memory 108 or 109 or IRB-PC register 110 contains the tag matched to the first requested instruction word, the comparator 111, 112 or 113 corresponding to the cache tag memory 108 or 109, or the IRB-PC register 110 matched to the first requested instruction word, sends the first cache instruction word memory instruction hit signal 124 or the second cache instruction word memory instruction hit signal 126 or the instruction read buffer instruction hit signal 122, via the logical judgment by the OR gate 114, so as to output the instruction hit signal. Then, the CPU determines whether to use the instruction word output from the multiplexer 104 according to this instruction word hit signal. The instruction word output from the multiplexer 104 performs the read operation from the cache instruction word memory 106 or 107 or the instruction read buffer to output according to the first cache instruction word memory instruction hit signal 124 and the instruction read buffer instruction hit signal 122. For example, if the cache instruction word memory 106 that corresponds to the cache tag memory 108 contains the needed instruction word, the comparator 111 subsequently outputs the first cache instruction word memory instruction hit signal 124 to control the multiplexer 104 to read the cache instruction word memory 106.

However, if the instruction read buffer 102 contains the first requested instruction word, the programmable counter 115 becomes a selector, to select the appropriate needed instruction word, and read it directly, rather than writing the cache instruction word memory 106 or the cache instruction word memory 107 first then read after.

If none of them is matched or it does not exist, at the moment after the CPU issues a request to the main memory to access the first requested instruction word via the bus interface unit 101, waiting for the bus interface unit 101 to reply with the first requested instruction word to the instruction read buffer 102, the bus interface unit 101 temporarily stores the replied first requested instruction word into the instruction read buffer 102. The first requested instruction word is also directly output simultaneously from the multiplexer 104 via the multiplexer 103 for the CPU to read. Thus, writing into the cache instruction word memory 106, 107 is postponed. When the next time to access the second requested instruction word addressed by CPU is required, the tag is temporarily stored in the cache tag memory 108 or cache tag memory 109. The comparators 111, 112 are used to respectively compare and determine whether the cache tag memory 108, 109 contains the tag matches to the output signal of the programmable counter 115, wherein the output signal contains the tag of the second requested instruction word. Moreover, the comparator 113 is used by the IRB-PC register 110 and the programmable counter 115 to compare and determine, in the same period, whether the instruction read buffer 102 contains the needed second requested instruction word.

If the cache instruction word memory 106 or the cache instruction word memory 107 or the instruction read buffer 102 contains the second requested instruction word that matches the tag of the second requested instruction word, or the instruction read buffer 102 temporarily stores the second requested instruction word, the second requested instruction word is read from the apparatus where it is stored or temporarily stored.

If the cache instruction word memory 106 or the cache instruction word memory 107 or the instruction read buffer 102 does not contain the second requested instruction word that matches the tag of the second requested instruction word, and the instruction read buffer 102 is not temporarily storing the second requested instruction word, the CPU issues a request to the main memory via the bus interface unit 101 again to access the second requested instruction word contained in the main memory, and waiting for the bus interface unit 101 to reply with the second requested instruction word to the instruction read buffer 102, the instruction word is directly input to the multiplexer 104 from the instruction read buffer 102 via the multiplexer 103, and is output from the multiplexer 104 for the CPU to read. Moreover, when the bus interface unit 101 waits for the reply of the second requested instruction word, the entire line including the first instruction word contained in the instruction read buffer 102 is written into the cache instruction word memory 106 or the cache instruction word memory 107. Referring to FIG. 2, when the instruction read buffer 102 writes the instruction word into the cache instruction word memory 106 or the cache instruction word memory 107, the four instruction words temporarily stored in the instruction read buffer 102 can be written in the any sequential manner.

Therefore, when the instruction cache reading operation is performed, the instruction read buffer can be used as a line in the cache instruction word memory to increase the instruction hit rate. Moreover, when the next instruction miss occurs, and the bus interface unit is waiting for the reply of the needed instruction word, the entire line, including the instruction word needed the previous time and temporarily stored in the instruction read buffer, is written. That is, by overlapping the time that is needed for the bus interface unit to wait for the reply, with the time for writing into the cache instruction word memory, the time wasted that results from the instruction miss is eliminated. Thus, the performance of the cache instruction word memory usage is improved.

Furthermore, it is known to those skilled in the art that the embodiment of the present invention and the method employing the same can also be applied in the cache apparatus having a plurality of cache instruction word memory.

The present invention utilizes adding the output path of the instruction read buffer, and adding the comparison of two comparators for control herein, so the instruction read buffer is used as the source of the instruction word when the reading operation is performed to increase the instruction hit rate. While the bus interface unit waits for the reply, the instruction read buffer is able to perform the writing operation to eliminate wasted time. Therefore, the present invention is able to achieve the objective of increasing the instruction hit rate and eliminating the unnecessary wasted time needed when an instruction miss occurs in the cache apparatus. Thus, the efficiency of the entire apparatus operation is enhanced.

Although the invention has been described with reference to a particular embodiment thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. An instruction cache apparatus using the instruction read buffer, comprising:

an instruction read buffer, used to temporarily store an instruction word replied by a bus interface unit;

a first cache instruction word memory, used to store the instruction word replied by the bus;

a second cache instruction word memory, used to store the instruction word replied by the bus;

an instruction hit analysis unit, wherein the instruction hit analysis unit receives an output signal of a programmable counter, after comparing and analyzing with a plurality of tags, outputs an instruction hit signal of the instruction read buffer and an instruction hit signal of the first cache instruction word memory;

a first multiplexer, wherein the first multiplexer receives a plurality of instruction word output signals of the instruction read buffer, and via the control according to a control signal of the instruction hit signal of the instruction read buffer and the instruction hit signal of the first cache instruction word memory, writes an instruction line including the instruction word and contained in the instruction read buffer to the first cache instruction word memory, or writes the instruction line into the second cache instruction word memory, or outputs the instruction word contained in the instruction read buffer directly to a second multiplexer, wherein the second multiplexer, connected to the first cache instruction word memory and the second cache instruction word memory and the instruction read buffer, receives and reads the expected instruction word from the first cache instruction word memory or the second cache instruction word memory or the instruction read buffer according to the instruction hit signal of the instruction read buffer and the instruction hit signal of the first cache instruction word memory.

2. The instruction cache apparatus using the instruction read buffer of claim 1, wherein the instruction hit analysis unit comprises:

a first cache tag memory, used to temporarily store the tag corresponding to the instruction word stored in the first cache instruction word memory;

a second cache tag memory, used to temporarily store the tag corresponding to the instruction word stored in the second cache instruction word memory;

an instruction read buffer (IRB)-programmable counter (PC) register, used to temporarily store at least one indication bit of the programmable counter;

a first comparator, wherein the first comparator is serially connected after the first cache tag memory, used to compare the tag of the first cache tag memory with the output signal of the programmable counter to output the instruction hit signal of the first cache instruction word memory;

a second comparator, wherein the second comparator is serially connected after the second cache tag memory, used to compare the tag of the second cache tag memory with the output signal of the programmable counter to output the instruction hit signal of the second cache instruction word memory; and a third comparator, wherein the third comparator is serially connected after the IRB-PC register, used to compare the indication bit with the output signal of the programmable counter to output the instruction hit signal of the instruction read buffer.

3. The instruction cache apparatus using the instruction read buffer of claim 2, wherein the first comparator, the second comparator and the third comparator are all connected to the programmable counter respectively.

4. The instruction cache apparatus using the instruction read buffer of claim 2, wherein the output signals from the first comparator, the second comparator and the third comparator are all input to an OR gate to output an instruction hit signal.

5. The instruction cache apparatus using the instruction read buffer of claim 1, wherein the first multiplexer comprises four input ports, and is connected after the instruction read buffer.

6. The instruction cache apparatus using the instruction read buffer of claim 1, wherein when reading from the instruction cache apparatus using the read register, the first multiplexer is controlled by the control signal to properly select a plurality of initial instruction words stored in the instruction read buffer.

7. The instruction cache apparatus using the instruction read buffer of claim 1, wherein when the instruction read buffer waits for the bus interface unit to reply, the writing operation can be performed simultaneously to the first cache instruction word memory or the second cache instruction word memory.

8. The instruction cache apparatus using the instruction read buffer of claim 1, wherein the second multiplexer is able to read the instruction word contained in the instruction read buffer via the first multiplexer directly.

9. An instruction cache apparatus using the instruction read buffer, comprising:

an instruction read buffer, used to temporarily store an instruction word replied by a bus interface unit;

a cache instruction word memory, used to store the instruction word replied by the bus;

an instruction hit analysis unit, wherein the instruction hit analysis unit receives an output signal of a programmable counter, after comparing and analyzing with a plurality of tags, outputs an instruction hit signal of the instruction read buffer and an instruction hit signal of the cache instruction word memory;

a first multiplexer, wherein the first multiplexer receives a plurality of instruction word output signals of the instruction read buffer, and via the control according to a control signal of the instruction hit signal of the instruction read buffer and the instruction hit signal of the cache instruction word memory, either writes an instruction line including the instruction word and contained in the instruction read buffer to the cache instruction word memory or outputs the instruction word contained in the instruction read buffer directly to a second multiplexer, wherein the second multiplexer, connected to the cache instruction word memory and the instruction read buffer, receives and reads the expected instruction word from the cache instruction word memory or the instruction read buffer according to the instruction hit signal of the instruction read buffer and the instruction hit signal of the cache instruction word memory.

10. The instruction cache apparatus using the instruction read buffer of claim 9, wherein the instruction hit analysis unit comprises:

at least a cache tag memory, used to temporarily store the tag corresponding to the instruction word stored in the cache instruction word memory;

an instruction read buffer (IRB)-programmable counter (PC) register, used to temporarily store at least one indication bit of the programmable counter;

a first comparator, wherein the first comparator is serially connected after the first cache tag memory, used to compare the tag of the first cache tag memory with the output signal of the programmable counter to output the instruction hit signal of the cache instruction word memory; and a second comparator, wherein the second comparator is serially connected after the IRB-PC register, used to compare the indication bit with the output signal of the programmable counter to output the instruction hit signal of the instruction read buffer.

11. The instruction cache apparatus using the instruction read buffer of claim 10, wherein the first comparator and the second comparator are all connected to the programmable counter respectively.

12. The instruction cache apparatus using the instruction read buffer of claim 10, wherein the output signals from the first comparator and the second comparator are all input to an OR gate to output an instruction hit signal.

13. The instruction cache apparatus using the instruction read buffer of claim 9, wherein the first multiplexer comprises four input ports, and is connected after the instruction read buffer.

14. The instruction cache apparatus using the instruction read buffer of claim 9, wherein when reading from the instruction cache apparatus using the read register, the first multiplexer is controlled by the control signal to properly select a plurality of initial instruction words stored in the instruction read buffer.

15. The instruction cache apparatus using the instruction read buffer of claim 9, wherein when the instruction read buffer waits for the bus interface unit to reply, the writing operation can be performed simultaneously to the cache instruction word memory.

16. The instruction cache apparatus using the instruction read buffer of claim 9, wherein the second multiplexer is able to read the instruction word contained in the instruction read buffer via the first multiplexer directly.

* * * * *